US008740240B1

(12) United States Patent
Merel

(10) Patent No.: US 8,740,240 B1
(45) Date of Patent: Jun. 3, 2014

(54) USER-OPERATED MOBILITY APPARATUS

(71) Applicant: Maynard I. Merel, Belle Harbor, NY (US)

(72) Inventor: Maynard I. Merel, Belle Harbor, NY (US)

( * ) Notice: Subject to any disclaimer, the term of this patent is extended or adjusted under 35 U.S.C. 154(b) by 0 days.

(21) Appl. No.: 14/139,165

(22) Filed: Dec. 23, 2013

(51) Int. Cl.
*B62D 51/02* (2006.01)
*A61H 3/04* (2006.01)

(52) U.S. Cl.
CPC ............... *A61H 3/04* (2012.01); *Y10S 180/907* (2013.01)
USPC ........................... 280/304.1; 180/907; 482/69

(58) Field of Classification Search
CPC .............................. B62D 51/02; B62D 51/002
USPC ........................... 180/907; 482/69; 280/304.1
See application file for complete search history.

(56) References Cited

U.S. PATENT DOCUMENTS 3,872,945 A * 3/1975 Hickman et al. ............. 180/65.6
4,948,156 A * 8/1990 Fortner ...................... 280/304.1
6,053,519 A * 4/2000 Poindexter et al. ......... 280/250.1
6,125,957 A * 10/2000 Kauffmann .................. 180/65.1
6,273,844 B1 * 8/2001 Kelsey et al. .................... 482/54
6,293,588 B1 * 9/2001 Clune ........................... 280/808
6,315,138 B1 * 11/2001 Dyson ........................... 212/336
6,375,209 B1 * 4/2002 Schlangen ................. 280/250.1
6,554,747 B1 * 4/2003 Rempe ............................ 482/38
6,659,211 B2 * 12/2003 Esposito ...................... 180/65.1
6,688,414 B1 * 2/2004 Bruno ........................... 180/233
6,926,106 B2 * 8/2005 Richey et al. ................ 180/65.1
7,381,163 B2 * 6/2008 Gordon et al. .................. 482/69
7,494,450 B2 * 2/2009 Solomon ......................... 482/69
7,624,826 B2 * 12/2009 Zhao ............................. 180/6.5
7,882,909 B2 * 2/2011 Pearlman et al. ............... 180/23
8,104,554 B2 * 1/2012 Graham ....................... 180/65.1
8,128,120 B2 * 3/2012 Porcheron ..................... 280/657
8,172,015 B2 * 5/2012 Molnar ........................ 180/65.1
8,172,023 B1 * 5/2012 Irvine ........................... 180/208
8,177,257 B2 * 5/2012 Dugas et al. .................. 280/755
8,181,992 B2 * 5/2012 Mulhern et al. .............. 280/755
8,505,657 B2 * 8/2013 Gong ........................... 180/65.1
8,522,907 B1 * 9/2013 Irvine ........................... 180/208
2002/0065173 A1 * 5/2002 Cook ............................. 482/69
2004/0143198 A1 * 7/2004 West ................................ 601/5
2005/0250624 A1 * 11/2005 Yu .................................. 482/69
2006/0017263 A1 * 1/2006 Chen et al. .................... 280/647
2010/0237215 A1 * 9/2010 Dahl ............................. 248/419
2013/0137553 A1 * 5/2013 Kim et al. ....................... 482/69
2013/0324379 A1 * 12/2013 Zondervan et al. ........... 482/130

FOREIGN PATENT DOCUMENTS

WO WO 9008669 A1 * 8/1990 ............... A61G 5/00

* cited by examiner

*Primary Examiner* — Nicole Verley
(74) *Attorney, Agent, or Firm* — Carter, DeLuca, Farrell & Schmidt, LLP

(57) ABSTRACT

A user-operated mobility apparatus includes a base unit having a drive assembly and wheels mounted thereto for enabling selective movement of the base unit along a surface. A plurality of support members extend from the base unit, define an interior area therebetween that is configured to receive a user, and each includes a plurality of spaced-apart engagement features for releasably engaging at least one accessory at various different positions along the support member. A user support assembly is mounted adjacent the free ends of the support members and includes a support cord extending into the interior area. The support cord is configured for releasably engaging a user to support the user within interior area.

18 Claims, 7 Drawing Sheets

USER-OPERATED MOBILITY APPARATUS

BACKGROUND

1. Technical Field

The present disclosure relates to mobility apparatus and, more particularly, to user-operated mobility apparatus that safely allows the user to maintain independent mobility.

2. Background of Related Art

Numerous individuals are limited in their ability to safely move around without assistance or supervision, whether at home, in a hospital setting, at an extended care facility, in public, etc. In particular, the elderly, infirm, handicapped, injured, etc. may be at risk of falling and injuring themselves when moving around without assistance or supervision. As a precaution, such individuals are typically closely monitored and/or restrained. Although monitoring and/or restraining such individuals helps keep them safe, it takes away their ability to be independently mobile, which can be both mentally and physically debilitating.

SUMMARY

In accordance with the present disclosure, a user-operated mobility apparatus is provided. The mobility apparatus includes a base unit having a drive assembly retained therein and a plurality of wheels mounted thereto. The wheels are operably coupled to the drive assembly such that the drive assembly is capable of selectively controlling and driving the wheels to move the base unit along a surface. A plurality of support members extend from a respective corner of the base unit to a free end. Each of the support members includes a plurality of spaced-apart engagement features for releasably engaging at least one accessory at various different positions along the support member. The support members cooperate to define an interior area therebetween that is configured to receive a user. A user support assembly is mounted adjacent the free ends of the support members. The user support assembly includes a support cord extending therefrom. The support cord is configured for releasably engaging a user to support the user within interior area.

In embodiments, the support cord is movable between a refracted position and an extended position and is biased towards the retracted position.

In embodiments, the user support assembly is configured as a locking retractor configured to permit gradual extension of the support cord towards the extended position and to lock the support cord in position in response to rapid extension of the support cord. The apparatus may further include an indicator configured to output an alert when it is detected that the support cord is locked in position. Additionally or alternatively, operation of the drive assembly may be inhibited when it is detected that the support cord is locked in position.

In embodiments, the support cord defines a fixed length. Multiple support cords may be provided, each having a different fixed length. Thus, a support cord may be provided according to a height of the user or other preferences, or a support cord from the plurality may be selected based upon the height of the user or other preferences.

In embodiments, the support cord includes a connector configured for releasably engaging a user. The connector includes a sensor configured to detect whether the connector is engaged to a user. The apparatus may further be configured to inhibit operation of the drive assembly when it is detected that the connector is not engaged to a user and/or when it is detected that second connector for connecting the support cord to the user support assembly is not engaged to the user support assembly.

In embodiments, the apparatus further includes a control assembly configured to receive user input for controlling operation of the drive assembly.

In embodiments, an emergency button is operably mounted on one of the support members and is configured to be selectively activatable by a user. In response to activation of the emergency button, operation of the drive assembly may be inhibited and/or an alert may be provided. An emergency button may additionally or alternatively be worn on the user for similar purposes.

In embodiments, a treadmill assembly is disposed on the base within the interior area.

In embodiments, the plurality of spaced-apart engagement features include apertures defined on opposing surfaces of the support members.

In embodiments, the at least one accessory includes a front panel configured for engagement between adjacent support members. Further, a controller may be coupled to the front panel and configured to receive user input to selectively control and drive the wheels to move the base unit.

In embodiments, the at least one accessory includes a seat assembly configured for selective engagement between adjacent support members. The seat assembly may further be transitionable between a use position, wherein a seat member of the seat assembly is presented for supporting a user, and a storage position, wherein the seat member is folded away. Hinged legs may be provided for allowing transition between the use and storage positions.

In embodiments, the at least one accessory includes a table assembly configured for selective engagement between adjacent support members. The table assembly may further be transitionable between a use position, wherein a tabletop of the table assembly is presented to a user, and a storage position, wherein the tabletop is folded away.

In embodiments, the at least one accessory include a safety bar, e.g., a telescoping or other suitable safety bar, configured for selective engagement between and to extend between adjacent support members.

In embodiments, the at least one accessory includes at least one handle configured for selective engagement with one of the support members.

In embodiments, the apparatus further includes a ramp configured to facilitate a user's entry and exit into the interior area. The ramp may be coupled to the apparatus. Alternatively, the ramp may be a separate component configured for use with the apparatus but not coupled thereto.

To the extent consistent, any of the above embodiments, or any of the other embodiments detailed herein may be used in conjunction with any or all of the other embodiments.

BRIEF DESCRIPTION OF THE DRAWINGS

Aspects and features of the present disclosure are described herein with reference to the accompanying drawings, wherein.

DETAILED DESCRIPTION

Figure 1:
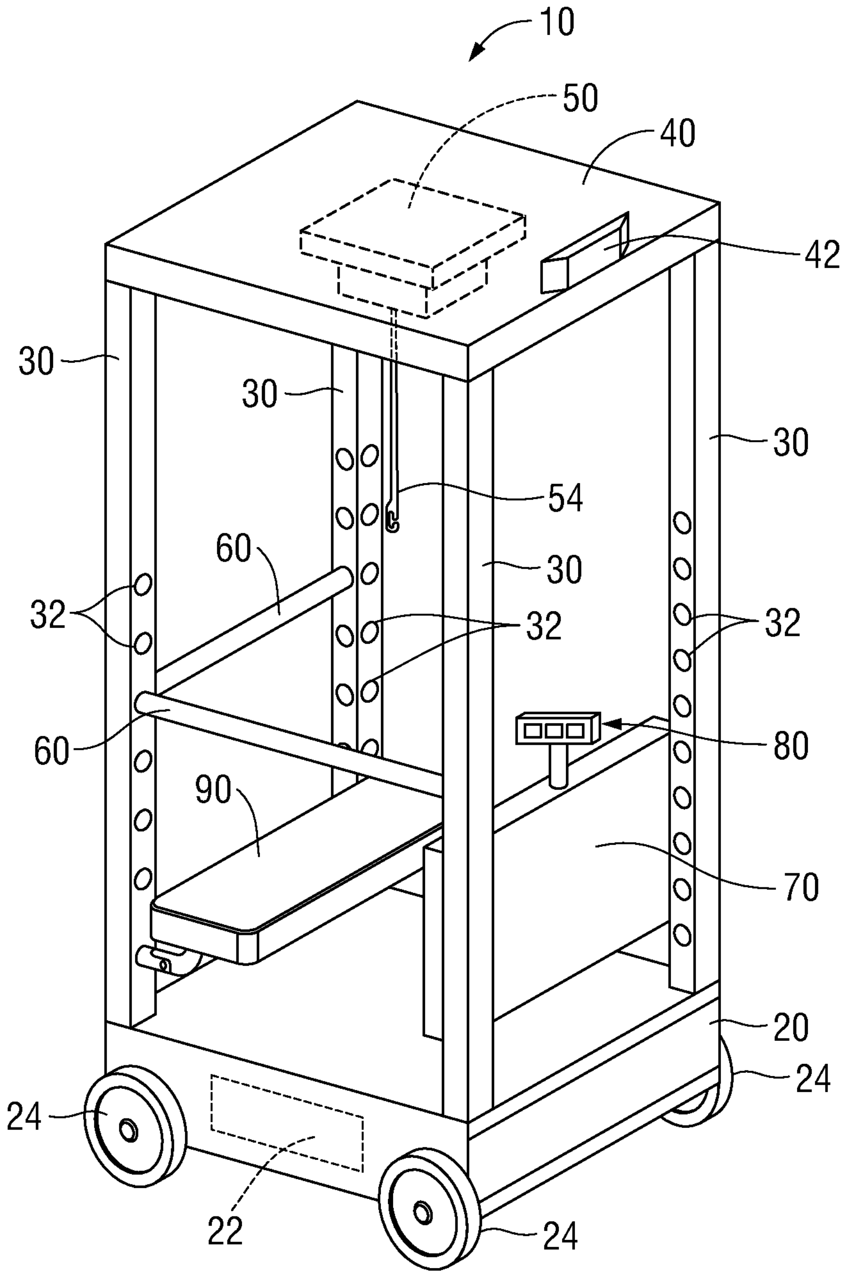
FIG. 1 is a perspective view of a mobility apparatus provided in accordance with the present disclosure.

Various embodiments of the present disclosure will now be described in detail with reference to the drawings, wherein like reference numerals identify similar or identical elements. In the following description, well known functions or constructions are not described in detail to avoid obscuring the present disclosure. To the extent consistent, any of the aspects and/or features of any of the embodiments detailed herein may be used in conjunction with any of the aspects and/or features of any of the other embodiments detailed herein. Further, any of the features of any of the embodiments may be omitted from that or other embodiments where not desired. That is, the apparatus of the present disclosure are fully customizable to meet the needs of a particular user.

Turning now to FIG. 1, a user-operated mobility apparatus provided in accordance with the present disclosure is shown generally identified by reference numeral 10. Apparatus 10 generally includes a base unit 20, a plurality of support members 30 extending upwardly from respective corners of base unit 20, a roof 40 supported at the upper ends of support members 30, a user support assembly 50 operably mounted on an underside of roof 40, one or more safety bars 60 extending between adjacent support members 30, a front panel 70 including a control assembly 80 mounted between adjacent support members 30, and a seat assembly 90 mounted between adjacent support members 30. Each of these components as well as additional components configured for use with apparatus 10 (or other similar apparatus) will be detailed, in turn, below.

Base unit 20, as shown in FIG. 1, defines the floor of apparatus 10, encloses a drive assembly 22, and includes four (4) wheels 24, at least two of which are operably coupled to drive assembly 22 to be selectively driven by drive assembly 22 and at least two of which are capable of being steered, thus enabling apparatus 10 to be selectively maneuvered along a support surface, e.g., the floor, the ground, etc. Base unit 20 further houses a rechargeable battery (not explicitly shown) for powering apparatus 10. A power cord (not explicitly shown) adapted to connect to a standard wall outlet is configured to be stored within a compartment (not explicitly shown) defined within base unit 20 to facilitate charging of the battery (not explicitly shown) of apparatus 10 when not in use. Additionally, base unit 20 may include one or more compartments or holders (not explicitly shown) for receiving weights to provide increased stability and/or balance to apparatus 10. Drive assembly 22 includes suitable components, e.g., a motor, brakes, steering assembly, etc., for enabling selective and controlled movement of apparatus 10. The operation of drive assembly 22 will be described in greater detail below.

Support members 30, as mentioned above, extend upwardly from respective corners of base unit 20. Each support member 30 defines a square transverse cross-sectional configuration and is positioned such that each adjacent pair of support members 30 includes a pair of opposed surfaces. The opposed surfaces of the support members 30 define a plurality of spaced-apart apertures 32 that are aligned with one another. As such, various components and/or assemblies may be releasably coupled to apparatus 10 via the apertures 32 of the support members 30, as will be detailed below. Thus, apparatus 10 may be fully customized to the needs and/or liking of a particular user. For example, depending on the height of the user, whether the user is sitting or standing, the location, etc., one or more support bars 60 may be placed at various different heights between one or more pairs of adjacent support members 30 by engaging each end of the support bars 60 within one of the apertures 32. Depending on their position, support bars 60 may be utilized to assist a user in entering/exiting apparatus 10 and/or inhibit a user from falling out of apparatus 10. Alternatively, apparatus 10 may be customized during manufacturing such that, for example, support bars 60 are permanently affixed to support members 30 at a desired position depending on the patient's height. Various other components and/or assemblies configured for releasable engagement with apparatus 10 via apertures 32 are detailed below, although any of these components and/or assemblies may likewise be permanently secured to apparatus during customized manufacturing.

Referring still to FIG. 1, as noted above, roof 40 is supported at the upper ends of support members 30 and includes user support assembly 50 operably mounted on an underside thereof. Roof 40 may further include an indicator 42, e.g., an LED display or other suitable indicator, that may be selectively illuminated in various different colors and/or manners, e.g., constant, blinking, etc., to provide various visual alerts to people surrounding apparatus 10. Particular alerts provided by indicator 42 will be detailed below with respect to the various features of apparatus 10. Additionally or alternatively, indicator 42 may include an audio output, e.g., a speaker, for providing audio alerts. Further, indicator 42 may incorporate an antenna, for broadcasting or otherwise providing remote alerts, e.g., to a networked computer or central monitoring station.

Figure 2A:
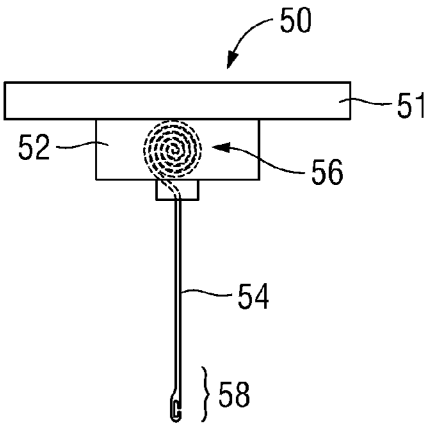
FIG. 2A is a side view of the user support assembly of the apparatus of FIG. 1, disposed in a retracted configuration.
Figure 2B:
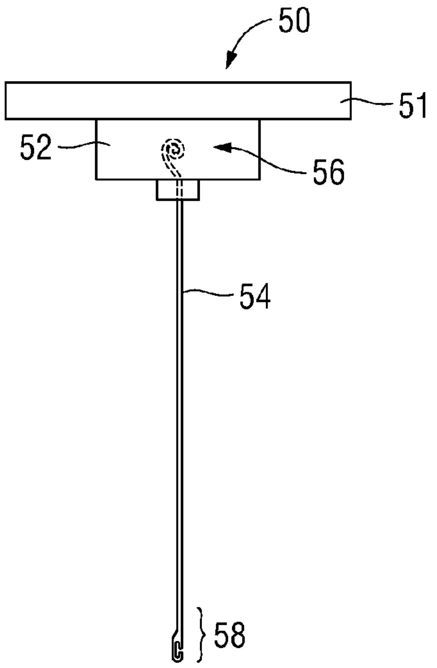
FIG. 2B is a side view of the user support assembly of FIG. 2A, disposed in an extended configuration.

With additional reference to FIGS. 2A-2B, user support assembly 50 includes a base 51, a housing 52, and a support cord 54 operably disposed within housing 52 and extending from housing 52 downwardly into apparatus 10. More specifically, housing 52 is mounted on base 51 and supports a spring-loaded reel and clutch mechanism 56 about which support cord 54 is capable of being wound and un-wound. Mechanism 56, together with support cord 54, defines a locking retractor configuration. That is, mechanism 56 biases support cord 54 towards a retracted or wound-up configuration, as shown in FIG. 2A, wherein support cord 54 is substantially wound-up about mechanism 56 and extends minimally from housing 52. Mechanism 56 allows support cord 54 to be extended in a gradual and consistent manner from the retracted configuration, shown in FIG. 2A, to an extended or un-wound configuration, shown in FIG. 2B, wherein support cord 54 is minimally wound about mechanism 56 and support cord 54 extends maximally from housing 52. This configuration enables a user to extend support cord 54 to a desired position, e.g., depending on the height of the user, the position of the user, and/or whether the user is standing or sitting. Once extended to the desired position, user connector 58, which is disposed at the free end of support cord 54, may be attached to the user, e.g., to a harness or belt (not shown) worn by the user. However if support cord 54 is pulled in a rapid or jerked manner, the clutch of mechanism 56 is engaged, automatically locking mechanism 56 and inhibiting further extension of support cord 54. As can be appreciated, such a feature is advantageous in that it serves to "catch" a user who would otherwise have fallen out of apparatus 10. Mechanism 56 may further be electrically coupled to the operational and control electronics 200 (FIG. 1) of apparatus 10 to provide a signal indicating that mechanism 56 has been locked. Such a feature alerts appropriate personnel to the fact that the user had begun to fall or is otherwise in a compromised position. Other configurations of user support assemblies are detailed below.

Figure 3:
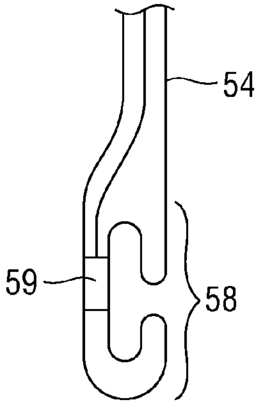
FIG. 3 is an enlarged, cross-sectional view of a user connector of the user support assembly of FIG. 2A.

Referring to FIGS. 2A-3, as noted above, user connector 58 of user support assembly 50 is configured to releasably engage a vest, harness, belt, or other suitable structure (not shown) worn by the user to couple the user to user support assembly 50 to the user. User connector 58 further includes a sensor 59 configured to detect engagement of user connector 58 to a corresponding structure on the user, e.g., the vest, harness, or belt (not shown). For example, sensor 59 may be configured as magnetic sensor configured to sense the presence of a magnetic material associated with the corresponding structure (not shown), may be configured as a proximity sensor configured to sense when the corresponding structure (not shown) is in close proximity to user connector 58, or may define any other suitable configuration that allows for the detection of engagement between user connector 58 and the corresponding structure (not shown). As detailed below, sensor 59 may be coupled to the operational and control electronics 200 (FIG. 10) of apparatus 10 (FIG. 1) and serve to inhibit movement of apparatus 10 (FIG. 1) if the user is not coupled to user support assembly 50.

Figure 4A:
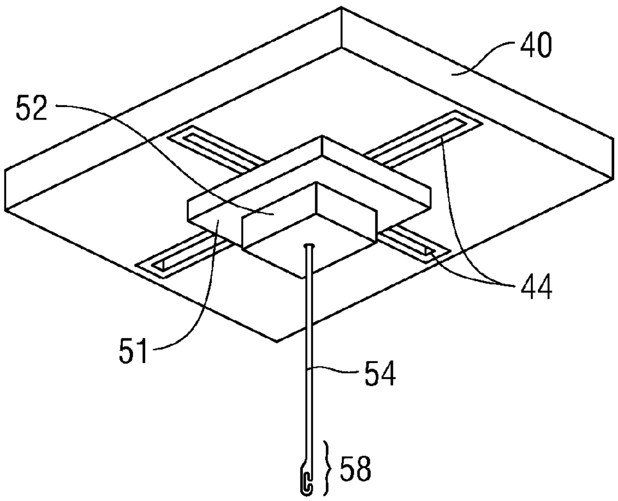
FIG. 4A is a bottom view of the user support assembly of FIG. 2A shown operably mounted on the roof of the apparatus of FIG. 1.

With reference to FIG. 4A, base 51 of user support assembly 50 is mounted on a track 44 defined on the underside of roof 40. As such, user support assembly 50 may be slid along track 44 to a desired position to provide a greater range of motion of the user within apparatus 10 (FIG. 1). A locking mechanism (not shown) may also be provided for selecting locking the position of user support assembly 50 relative to track 44. Although track 44 is shown defining first and second track components in a crossed pattern, it is envisioned that any other suitable track configurations e.g., circular, curved, square, rectangular, etc., may be provided.

Figure 4B:
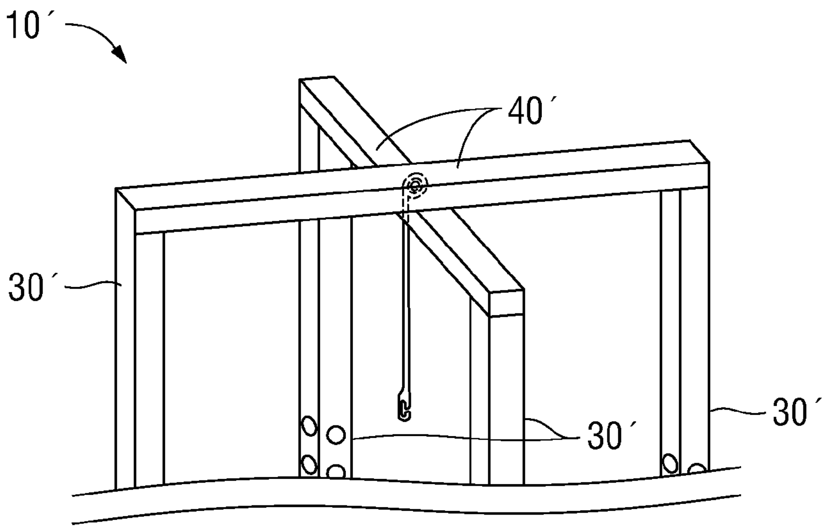
FIG. 4B is a perspective view of an upper portion of another mobility apparatus provided in accordance with the present disclosure.

Another embodiment of an apparatus provided in accordance with the present disclosure and similar to apparatus 10 (FIG. 1) is shown in FIG. 4B identified by reference numeral 10'. Apparatus 10' differs from apparatus 10 (FIG. 1) in that, rather than providing a roof, apparatus 10' simply includes crossbars 40' coupling the upper ends of support members 30' to one another and extending therebetween. Any of the user support assemblies detailed herein may be coupled to crossbars 40' similarly as detailed above with respect to roof 40 of apparatus 10 (see FIG. 1).

Figure 4C:
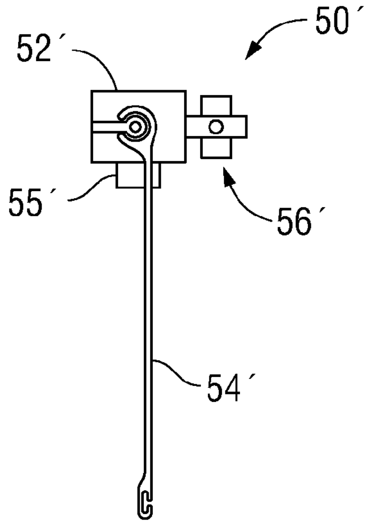
FIG. 4C is a side view of another user support assembly configured for use with any of the apparatus detailed herein.

With reference to FIG. 4C, another embodiment of a user support assembly configured for use with any of the apparatus detailed herein is shown generally identified by reference numeral 50'. User support assembly 50' includes a fixed length support cord 54' (as opposed to the retractable configuration of user support assembly 50 (FIG. 1)) that is releasably engagable with a base 52' at a first end thereof and to a user at a second end thereof. A lock assembly 56' is provided to inhibit access to the first end of support cord 54', thus inhibiting disengagement of support cord 54' from base 52'. Such a feature may be utilized such that only certain personnel, e.g., hospital personnel, care takers, etc., may access and disengage support cord 54' from base 52', while others are inhibited from doing so. Support cord 54', having a fixed length, may be selected based upon the user's height, whether the user plans to stand or sit, or based upon other such factors. Support assembly 50' may include a sensor 55' configured to sense an increase in pressure on support cord 54' above a pre-determined threshold. Support assembly 50' may be electrically coupled to the operational and control electronics 200 (FIG. 10) such that, upon detecting such an increase in pressure, a signal is provided triggering an alert that informs appropriate personnel to the fact that the user had begun to fall or is otherwise in a compromised position. The signal may additionally or alternatively inhibit apparatus 10 (FIG. 1) from further movement. Further, similarly as above, a sensor (not explicitly shown, similar to sensor 59 (FIG. 3)) may be associated with the connecting ends of support cord 54' such that movement of apparatus 10 (FIG. 1) is inhibited if both the first and second ends of support cord 54' are not engaged to base 52' and the user, respectively.

Figure 4D:
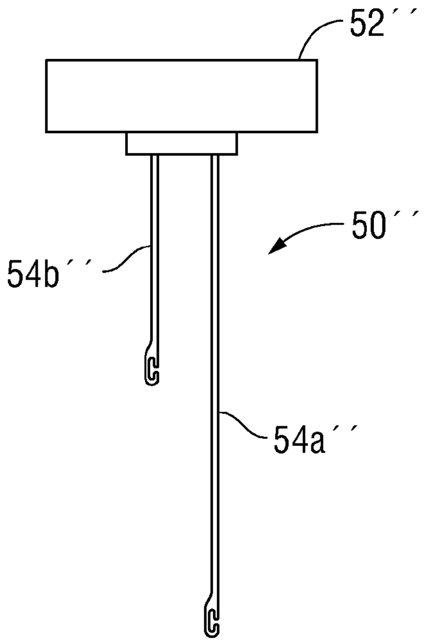
FIG. 4D is a side view of still another user support assembly configured for use with any of the apparatus detailed herein.

With reference to FIG. 4D, still another embodiment of a user support assembly configured for use with any of the apparatus detailed herein is shown generally identified by reference numeral 50". User support assembly 50" is similar to user support assembly 50' (FIG. 4C) and may include any of the features thereof and/or any of the features of user support assembly 50 (FIG. 1). User support assembly 50" differs from user support assembly 50' (FIG. 4C) in that rather than providing a single support cord, user support assembly 50" includes first and second support cords **54*a*", 54*b*" of different length, both of which are releasably engagable with a base 52" at a first end thereof and to a user at a second end thereof. One of the cords, e.g., support cord 54*a*", is configured for use when the user desires to remain in a standing position during use. The other cord, e.g., support cord 54*b*"** is configured for use when the user desires to be seated during use.

Figure 5A:
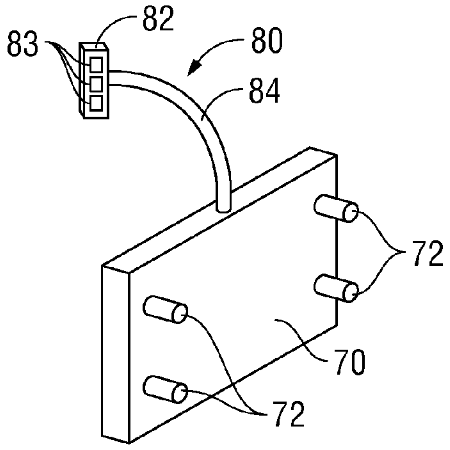
FIG. 5A is a perspective view of the front panel and control assembly of the apparatus of FIG. 1, with the control assembly disposed in a retracted position.
Figure 5B:
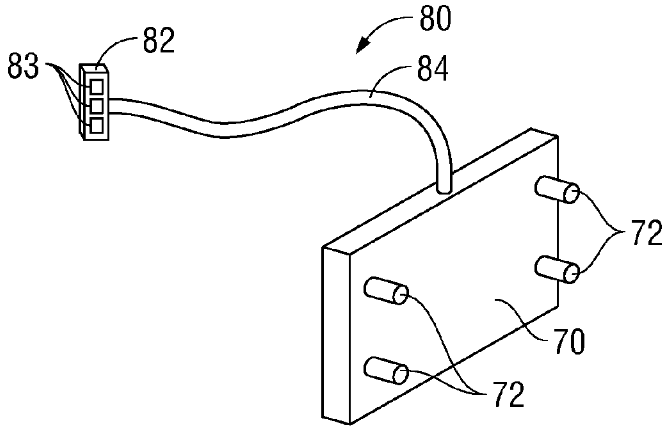
FIG. 5B is a perspective view of the front panel and control assembly of FIG. 5A, with the control assembly disposed in an extended position.

Turning to FIGS. 5A-5B, in conjunction with FIG. 1, front panel 70 is shown including control assembly 80 coupled thereto. Front panel 70 includes a plurality of pegs 72 disposed along opposite sides thereof that are configured for engagement within apertures 32 of support members 30 to releasably engage front panel 70 to apparatus 10, although any other suitable engagement may alternatively be provided. It is further envisioned that side and/or back panels (not shown) be provided similar to front panel 70. Front panel 70, the side panels (not shown), and/or back panel (not shown) may be engagable with apparatus 10 as detailed above or may be permanently affixed thereto. Control assembly 80 may be coupled to front panel 70 as shown, the side or back panels (not shown), or in any other suitable position. Control assembly 80 is shown including a controller 82 tethered to front panel 70 via a retractable tether 84, although controller 82 may alternatively be cordless and include a docking station (not shown) mounted on front panel 70. Controller 82 includes one or more user-interface components 83, e.g., switches, buttons, joy sticks, steering wheels, etc., that enable a user to control the operation of apparatus 10. Controller 82 may be wirelessly coupled to the operational and control electronics 200 (FIG. 10) of apparatus 10 or may be coupled thereto via a wired connection. The use and control of apparatus 10 will be detailed below.

Figure 6A:
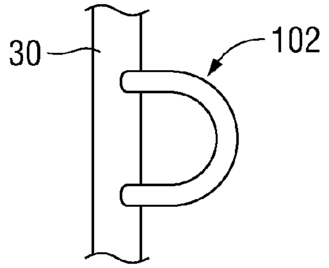
FIG. 6A is a perspective view of a handle configured for use with the apparatus of FIG. 1.
Figure 6B:
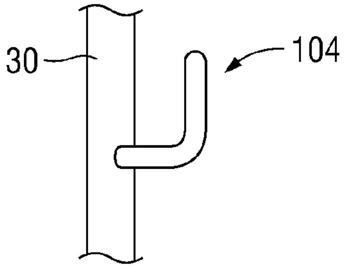
FIG. 6B is a perspective view of another handle configured for use with the apparatus of FIG. 1.

Referring to FIGS. 6A and 6B, various embodiments of handles 102, 104 are shown. In particular, handle 102 defines a “C”-shaped configuration and is configured for releasable engagement with two adjacent apertures 32 (FIG. 1) of one of support members 30. Handle 104 defines an “L”-shaped configuration and is configured for releasable engagement with one of the apertures 32 (FIG. 1) of one of support members 30. Although exemplary handles 102, 104 are shown, various other configurations of handles are also contemplated, e.g., walker-style handles or other suitable handles. As can be appreciated, handle 102, 104 may be positioned to facilitate a user’s ability to enter apparatus 10 (FIG. 1), get up from a seated position, and/or to simply provide a rigid support for the user to grasp while apparatus 10 (FIG. 1) is in motion.

Figure 7A:
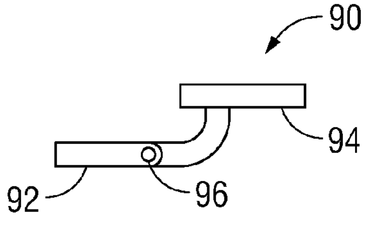
FIG. 7A is a side view of the seat assembly of the apparatus of FIG. 1, disposed in a use position.
Figure 7B:
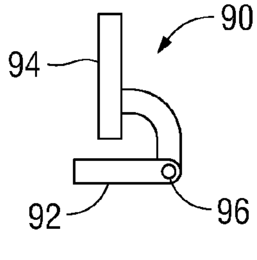
FIG. 7B is a side view of the seat assembly of FIG. 7A, disposed in a storage position.

FIGS. 1, and 7A-7B illustrate seat assembly 90. Seat assembly 90 includes first and second legs 92 (only one of which is shown) disposed on either side thereof and a seat member 94 supported by legs 92. Seat member 94 is configured to support a user. Legs 92 are releasably engagable with apertures 32 of support members 30 to permit seat assembly 90 to be mounted at a desired height and position within apparatus 10, although seat assembly 90 may be permanently mounted in some embodiments. Each leg 92 is formed from first and second leg components coupled to one another via a hinge joint 96. Hinge join 96 allows seat assembly 90 to be raised and lowered between a use position, as shown in FIG. 7A, wherein seat member 94 is presented for supporting the user, and a storage position, as shown in FIG. 7B, wherein seat member 94 is folded up out of the way to inhibit interfering with the user when sitting is not desired.

Figure 8A:
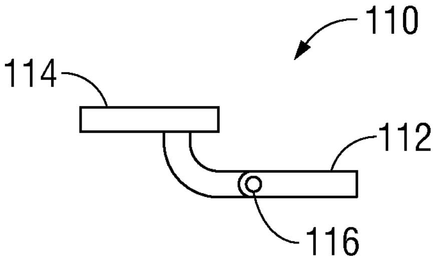
FIG. 8A is a side view of a table assembly configured for use with apparatus of FIG. 1, disposed in a use position.
Figure 8B:
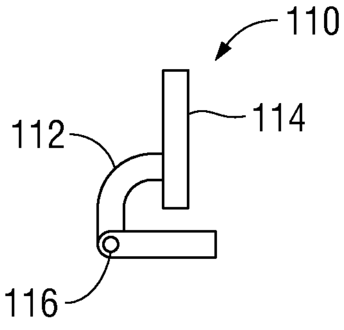
FIG. 8B is a side view of the table assembly of FIG. 8A, disposed in a storage position.

Turning to FIGS. 8A and 8B, a table assembly 110 configured for use with apparatus 10 (FIG. 1) is shown. Table assembly 110 includes first and second legs 112 (only one of which is shown) disposed on either side thereof, and a tabletop 114 supported by legs 112. Legs 112, similar to seat assembly 90 (FIGS. 7A-7B) are releasably engagable with apertures 32 of support members 30 (see FIG. 1) to permit table assembly 110 to be mounted at a desired height and position within apparatus 10 (FIG. 1). Legs 112 further include first and second leg components coupled to one another via a hinge joint 116 that allows table assembly 110 to be raised and lowered between a use position, as shown in FIG. 8A, wherein tabletop 114 is presented for use by the user, and a storage position, as shown in FIG. 8B, wherein tabletop 114 is folded up out of the way. A basket assembly (not shown) may be provided similarly as table assembly 110.

Figure 9A:
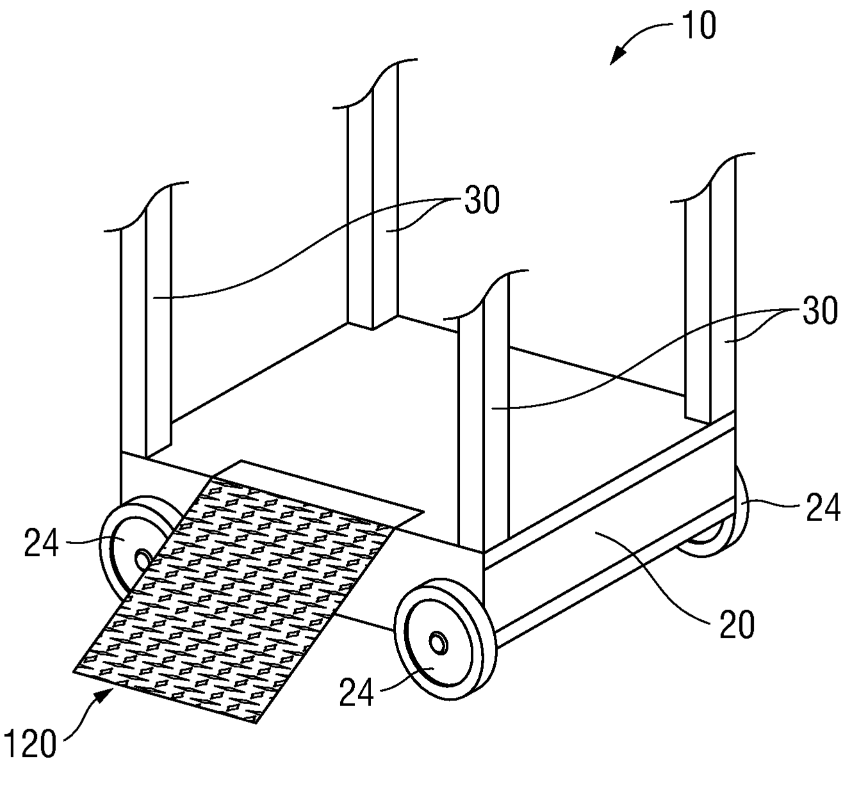
FIG. 9A is a perspective view of a lower portion of the apparatus of FIG. 1, including a ramp coupled thereto.

FIG. 9A illustrates a ramp 120 coupled to a side of base unit 20 of apparatus 10. Ramp 120 is releasably coupled to base unit 20 and is provided to facilitate a users entry and exit from apparatus 10. As an alternative to or in addition to ramp 120, one or more steps may be provided. Instead of coupling ramp 120 to base unit 20 of apparatus 10, the ramp may be a separate component configured for use with apparatus 10, e.g., ramping to a similar height as base unit 20.

Figure 9B:
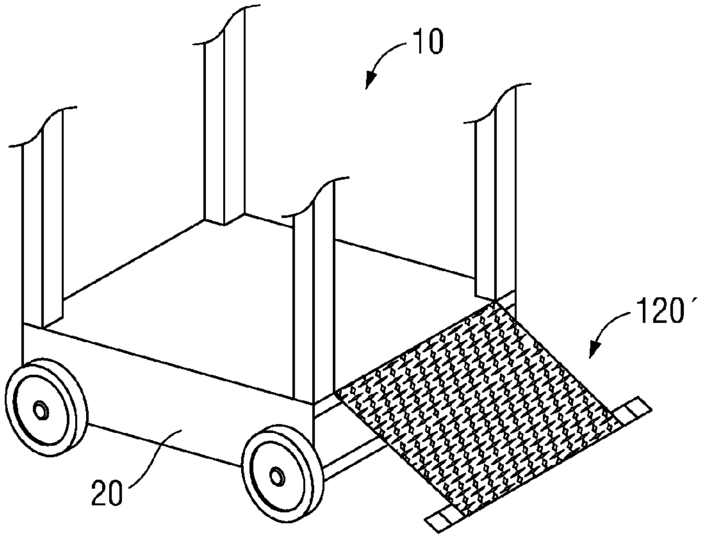
FIG. 9B is a perspective view of the lower portion of the apparatus of FIG. 1 including another ramp coupled thereto in a lowered position.
Figure 9C:
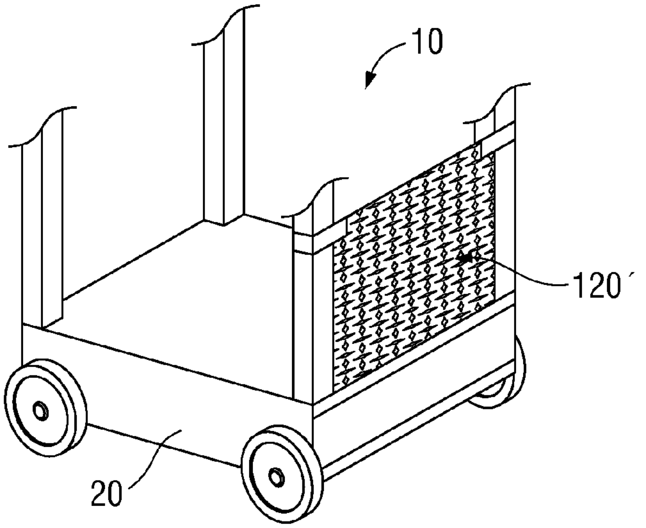
FIG. 9C is a perspective view of the lower portion of the apparatus of FIG. 1 including the ramp of FIG. 9B coupled thereto in a raised position.

FIGS. 9B-9C illustrate another ramp 120' that is coupled to a front of base unit 20 and is movable between a lowered position, as shown in FIG. 9B, and a raised position, as shown in FIG. 9C. Ramp 120' may be manually movable between the two positions, or may be coupled to drive assembly 22 (FIG. 1) for powered raising and lowering of ramp 120'.

Figure 9D:
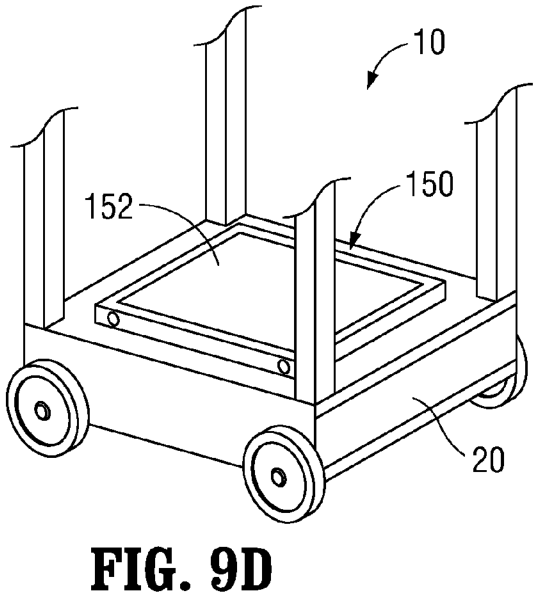
FIG. 9D is a perspective view of the lower portion of the apparatus of FIG. 1 including a treadmill assembly disposed thereon.

With reference to FIG. 9D, base 20 of apparatus 10 is shown including a treadmill assembly 150 disposed thereon. Treadmill assembly 150 includes a powered tread 152, as is known in the art of treadmills, and is operably coupled to drive assembly 22 (FIG. 1) and the operational and control electronics 200 (FIG. 10) of apparatus 10 to receive power and control signals therefrom. Positioning treadmill assembly 150 about base 20 is advantageous in that it provides the user with the ability to exercise anywhere apparatus 10 can go, while also providing the various safety benefits of apparatus 10, e.g., as provided by the user support assemblies detailed above. Control assembly (FIG. 1) may be operable to selectively control treadmill assembly 150, e.g., to vary the speed, incline, and/or duration of use.

Figure 10:
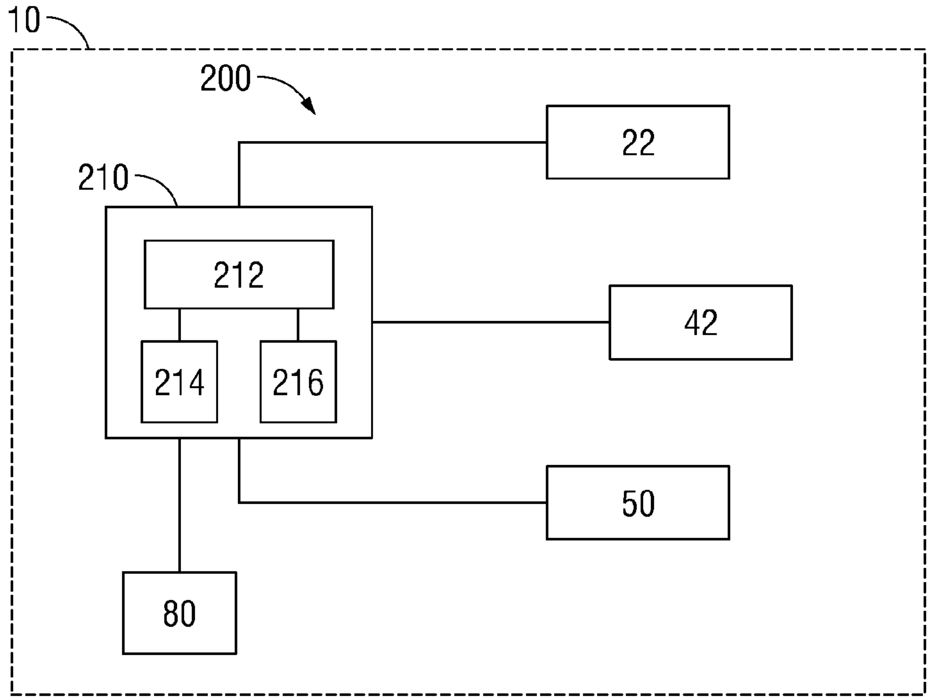
FIG. 10 is a schematic illustration of the operational and control electronics of the apparatus of FIG. 1.

With reference to FIG. 10, the operational and control electronics 200 of apparatus 10 are described. The operational and control electronics 200 of apparatus 10 may be provided in a centralized location, e.g., within base unit 20, or may be distributed at one or more locations on or within apparatus 10. The operational and control electronics 200 include a CPU 210 that is operably coupled to drive assembly 22, indicator 42, user support assembly 50, and control assembly 80 (as well as treadmill assembly 150 (FIG. 9D) in embodiments where so provided). CPU 210 includes a processor 212, an input/output 214, and a memory 216. Input/output 214 is configured to enable communication between CPU 210 and each of drive assembly 22, indicator 42, user support assembly 50, and control assembly 80 for receiving feedback therefrom and/or providing control signals thereto. Memory 216 stores suitable computer-readable instructions for processor 212 to communicate with and/or control drive assembly 22, indicator 42, user support assembly 50, and control assembly 80.

With respect to drive assembly 22 and control assembly 80, CPU 210 receives user-input control signals from control assembly 80, e.g., to move apparatus 10 forward or backward, speed up or slow down (e.g., brake), raise/lower the ramp, and/or to turn wheels 24 to redirect apparatus 10. Based upon the control signals received from control assembly 80, CPU 210 controls the operation of drive assembly 22 and the orientation of wheels 24 to move apparatus 10 in accordance with the input from control assembly 80. In some embodiments, CPU 210 only permits operation of drive assembly 22 when the user is continually depressing an activation button associated with control assembly 80. Such a feature is beneficial in that it ensures that movement of apparatus 10 is halted if for some reason the user is no longer able to maintain the button in a depressed state. Activation may also be inhibited where ramp 12' (FIGS. 9B-9C) is not fully stowed in the raised position, where the support bars 60 (FIG. 1) are not fully engaged, or in accordance with any other suitable safety protocol.

With respect to user support assembly 50, as detailed above, sensor 59 (FIG. 3) is configured to sense whether a user is coupled to connector 58 (FIG. 3) of user support assembly 50. This status, e.g., whether a user is coupled to user support assembly 50, is communicated to CPU 210. Once it is confirmed that the user is properly connected, CPU 210 enables operation of drive assembly 22. On the other hand, if connection is not confirmed, CPU 210 inhibits the operation of drive assembly 22. Likewise, if the user is disconnected during operation, CPU 210 applies the brakes to stop apparatus 10 and prevents further operation of drive assembly 22. Mechanism 56 of user support assembly 50 may further be configured, as noted above, to provide a signal to CPU 210 indicating that mechanism 56 has been locked. CPU 210 may inhibit operation of drive assembly 22 and/or stop apparatus 10 in response to receiving such a signal from mechanism 56. Similar operation may be effected with respect to user support assemblies 50', 50" (FIGS. 4C and 4D, respectively).

With respect to indicator 42, CPU 210 outputs control signal(s) to indicator 42 to provide an appropriate alert depending on the situation and/or condition. That is, depending on the particular circumstances, indicator 42 may provide a visual alert, an audible alert, and/or may transmit a remote alert. The particular alerting protocol is stored in memory 216 and may be customized to the particular user, condition of the user, and/or setting in which apparatus 10 is used. CPU 210 may signal indicator 42, for example, to provide an appropriate alert indicating: that apparatus 10 is moving (and may provided different alerts for forward motion versus backwards motion); that a user is or is not coupled to user support assembly 50; that mechanism 56 has been locked, etc.

Figure 11:
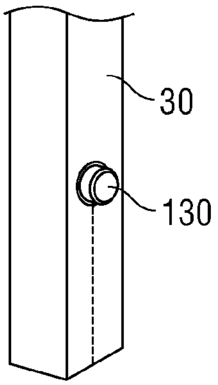
FIG. 11 is a perspective view of one of the support members of the apparatus of FIG. 1 shown including an emergency button coupled thereto.

With additional reference to FIG. 11, apparatus 10 (FIG. 1) may further include one or more emergency buttons 130 mounted on one or more of support members 30 at any suitable position(s). Emergency buttons 130 are coupled to CPU 210 and are configured to provide a signal to CPU 210 when activated, e.g., when depressed. CPU 210, in turn, may be configured to inhibit operation of drive assembly 22 (FIG. 1), stop apparatus 10 (FIG. 1), and/or provide an alert in response to receiving a signal from an emergency button 130 indicating that the emergency button 130 has been activated. As can be appreciated, such a feature enables a user in distress to signal, e.g., via providing a visual, audible, and/or remote alert, to appropriate personnel.

Figure 12:
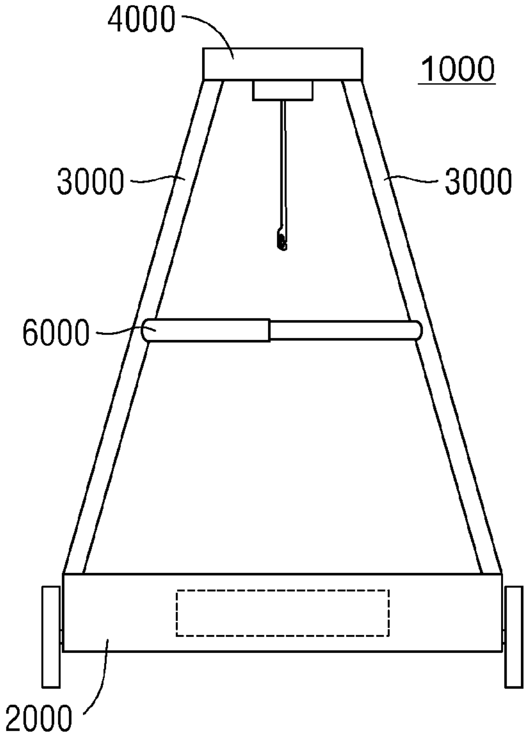
FIG. 12 is a front view of another mobility apparatus provided in accordance with the present disclosure.

FIG. 12 illustrates another user-operated mobility apparatus provided in accordance with the present disclosure shown generally identified by reference numeral 1000. Apparatus 1000 is similar to apparatus 10 (FIG. 1) and, thus, only the differences therebetween will be detailed below for purposes of brevity. Base unit 2000 of apparatus 1000 includes a plurality of support members 3000 extending upwardly from respective corners of base unit 2000. A roof 4000 is supported at the upper ends of support members 3000. However, rather than support members 3000 extending vertically as in apparatus 10 (FIG. 1), support members 3000 are angled inwardly towards one another to define a triangular cross-sectional configuration. Such a configuration provided added stability to apparatus 1000.

As a result of the angled configuration of support members 3000 of apparatus 1000, and, thus, the varied distance between support members 3000 at different heights, safety bars 6000 are telescopically extendable so that safety bars 6000 may be coupled to support members 3000 at any desired height, similarly as detailed above with respect to apparatus 10 (FIG. 1).

It will be understood that various modifications may be made to the embodiments of the present disclosure. Therefore, the above description should not be construed as limiting, but merely as exemplifications of embodiments. Those skilled in the art will envision other modifications within the scope and spirit of the present disclosure.

What is claimed is:

1. A user-operated mobility apparatus, comprising:

a base unit including a drive assembly retained therein and a plurality of wheels mounted thereto and operably coupled to the drive assembly, the drive assembly configured to selectively control and drive the wheels to move the base unit along a surface;

a plurality of support members, each support member extending from a respective corner of the base unit to a free end, each of the support members including a plurality of spaced-apart engagement features for releasably engaging at least one accessory at various different positions along the support member, the plurality of support members cooperating to define an interior area therebetween that is configured to receive a user;

a user support assembly mounted adjacent the free ends of the plurality of support members, the user support assembly including a support cord extending therefrom into the interior area, the support cord configured for releasably engaging a user to support the user within interior area;

wherein the support cord includes a connector configured for releasably engaging a user, the connector including a sensor configured to detect whether the connector is engaged to a user; and wherein operation of the drive assembly is inhibited when it is detected that the connector is not engaged to a user.

2. The user-operated mobility apparatus according to claim 1, wherein the support cord is movable between a retracted position and an extended position and is biased towards the retracted position.

3. The user-operated mobility apparatus according to claim 2, wherein the user support assembly is configured as a locking retractor configured to permit gradual extension of the support cord towards the extended position and to lock the support cord in position in response to rapid extension of the support cord.

4. The user-operated mobility apparatus according to claim 2, wherein operation of the drive assembly is inhibited when it is detected that the support cord is locked in position.

5. The user-operated mobility apparatus according to claim 1, wherein the support cord defines a fixed length.

6. The user-operated mobility apparatus according to claim 1, wherein first and second support cords of fixed length are provided, the first and second support cords defining different lengths.

7. The user-operated mobility apparatus according to claim 1, further including an emergency button configured to be selectively activatable by a user.

8. The user-operated mobility apparatus according to claim 7, wherein, in response to activation of the emergency button, operation of the drive assembly is inhibited.

9. The user mobility apparatus according to claim 1, further comprising a treadmill assembly disposed on the base within the interior area.

10. The user mobility apparatus 1, wherein the at least one accessory includes a front panel configured for engagement between adjacent support members.

11. The user mobility apparatus according to claim 10, further including a controller coupled to the front panel, the controller configured to receive user input to selectively control and drive the wheels to move the base unit.

12. The user mobility apparatus according to claim 1, wherein the at least one accessory includes a seat assembly configured for selective engagement between adjacent support members.

13. The user mobility apparatus according to claim 12, wherein the seat assembly is transitionable between a use position, wherein a seat member of the seat assembly is presented for supporting a user, and a storage position, wherein the seat member is folded away.

14. The user mobility apparatus according to claim 1, wherein the at least one accessory includes a table assembly configured for selective engagement between adjacent support members.

15. The user mobility apparatus according to claim 14, wherein the table assembly is transitionable between a use position, wherein a tabletop of the table assembly is presented to a user, and a storage position, wherein the tabletop is folded away.

16. The user mobility apparatus according to claim 1, wherein the at least one accessory includes at least one safety bar configured for selective engagement between and to extend between adjacent support members.

17. The user mobility apparatus according to claim 1, wherein the at least one accessory includes a handle configured for selective engagement with one of the support members.

18. The user mobility apparatus according to claim 1, further including a ramp configured to facilitate a user's entry and exit into the interior area.

* * * * *